(12) United States Patent
Han et al.

(10) Patent No.: US 9,172,079 B2
(45) Date of Patent: Oct. 27, 2015

(54) RECHARGEABLE BATTERY

(75) Inventors: Min-Yeol Han, Yongin-si (KR);
Sang-Won Byun, Yongin-si (KR);
Jeong-Won Oh, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 771 days.

(21) Appl. No.: 13/468,260

(22) Filed: May 10, 2012

(65) Prior Publication Data

US 2013/0196179 A1    Aug. 1, 2013

Related U.S. Application Data

(60) Provisional application No. 61/593,547, filed on Feb. 1, 2012.

(51) Int. Cl.
| | |
|---|---|
| H01M 2/02 | (2006.01) |
| H01M 2/34 | (2006.01) |
| H01M 2/30 | (2006.01) |
| H01M 2/04 | (2006.01) |
| H01M 10/04 | (2006.01) |

(52) U.S. Cl.
CPC ................ *H01M 2/345* (2013.01); *H01M 2/04* (2013.01); *H01M 2/30* (2013.01); *H01M 2/348* (2013.01); *H01M 10/0413* (2013.01); *H01M 2200/103* (2013.01); *H01M 2200/20* (2013.01)

(58) Field of Classification Search
CPC ................... H01M 2200/103; H01M 2200/20; H01M 2/345; H01M 2/348; H01M 2200/108
See application file for complete search history.

(56) References Cited

U.S. PATENT DOCUMENTS

| | | | |
|---|---|---|---|
| 5,800,937 A | 9/1998 | Decker et al. | |
| 7,390,589 B2 * | 6/2008 | Shin et al. | 429/82 |
| 2004/0170887 A1 | 9/2004 | Masumoto et al. | |
| 2004/0257036 A1 * | 12/2004 | Kim | 320/112 |
| 2005/0083166 A1 * | 4/2005 | Senda et al. | 337/159 |
| 2010/0167107 A1 * | 7/2010 | Byun et al. | 429/56 |
| 2010/0279156 A1 * | 11/2010 | Kim et al. | 429/56 |
| 2010/0291421 A1 * | 11/2010 | Byun et al. | 429/61 |
| 2011/0177387 A1 | 7/2011 | Byun et al. | |

FOREIGN PATENT DOCUMENTS

| | | |
|---|---|---|
| EP | 2226868 A1 | 9/2010 |
| KR | 10-2008-0019321 A | 3/2008 |
| KR | 10-0867068 | 10/2008 |

OTHER PUBLICATIONS

European Search Report dated Apr. 25, 2013.

* cited by examiner

*Primary Examiner* — Carlos Barcena
(74) *Attorney, Agent, or Firm* — Lee & Morse, P.C.

(57) ABSTRACT

A rechargeable battery includes a case having an interior and an exterior, an electrode assembly having a first electrode and a second electrode, the electrode assembly being disposed in the interior of the case, an electrode terminal, an electrode connection portion, the electrode connection portion being electrically connected to the electrode terminal through a fuse portion, the fuse portion being positioned between and extending between the electrode connection portion and the electrode terminal.

18 Claims, 5 Drawing Sheets

RECHARGEABLE BATTERY

CROSS-REFERENCE TO RELATED APPLICATION

The present application claims priority under 35 U.S.C. §119(e) to U.S. Provisional Application No. 61/593,547, filed on Feb. 1, 2012, in the United States Patent and Trademark Office, and entitled: "Rechargeable Battery," which is incorporated herein by reference in its entirety.

BACKGROUND

The described technology relates generally to a rechargeable battery. Unlike a primary battery, a rechargeable battery is repeatedly charged and discharged. A small-capacity rechargeable battery has been used for a small electronic device such as a mobile phone, a laptop computer, and a camcorder, and a large-capacity rechargeable battery has been used as a power source for driving a motor of a hybrid vehicle.

Lately, a high power rechargeable battery has been introduced. The high power rechargeable battery uses a high energy density non-aqueous electrolyte. The high power rechargeable battery includes a plurality of rechargeable batteries coupled in series. Such a high power rechargeable battery has been used for an apparatus requiring high power, for example, for driving a motor of an electric vehicle.

The above information disclosed in this Background section is only for enhancement of understanding of the background of the described technology and therefore it may contain information that does not form the prior art that is already known in this country to a person of ordinary skill in the art.

SUMMARY

According to an embodiment, there is provided a rechargeable battery, including a case having an interior and an exterior, an electrode assembly having a first electrode and a second electrode, the electrode assembly being disposed in the interior of the case, an electrode terminal, an electrode connection portion, the electrode connection portion being electrically connected to the electrode terminal through a fuse portion, the fuse portion being positioned between and extending between the electrode connection portion and the electrode terminal.

The electrode terminal may include a short circuit tab at the exterior of the case. The first electrode may be electrically connected to the electrode connection portion. The first electrode, the electrode connection portion and the short circuit tab may be electrically insulated from the second electrode.

The second electrode may be electrically connected to the case. The electrode terminal further may include a short circuit plate electrically connected to the second electrode through the case, the short circuit plate being spaced apart from the short circuit tab and being deformable into contact with the short circuit tab to electrically connect the first electrode and the second electrode to trigger a short circuit condition.

The electrode connection portion may have an external member including the fuse portion. The fuse portion may be meltable in response to a short circuit current generated upon triggering of the short circuit condition to disconnect the short circuit tab and the external member.

The rechargeable battery may further include an elastic member between the short circuit tab and the case. The rechargeable battery may further include a short circuit tab insulating member between the short circuit tab and the case, the elastic member being between the short circuit tab insulating member and the case. The external member may be configured to exert a compressive force on the short circuit tab to maintain the elastic member in a compressed state.

The electrode terminal may be configured such that a releasing of the force of the external member on the short circuit tab upon melting of the fuse portion releases the elastic member from the compressed state to exert an elastic force on the short circuit tab to separate the short circuit tab from the short circuit plate.

The electrode terminal may be located at a short circuit hole in the case. The elastic member may include at least one spring member adjacent to an outside edge of the short circuit hole. The at least one spring member may be a coil spring.

The case may include at least one recess that accommodates the elastic member. The at least one recess may entirely accommodate the elastic member in the compressed state such that the short circuit tab insulation member contacts the case.

The electrode connection portion may include a rivet terminal extending from the interior of the case to the exterior of the case through a hole in the case. The external member may include a terminal plate coupled to a distal end of the rivet terminal outside the case and a fixing member coupled to the rivet terminal between the terminal plate and the case.

The rechargeable battery may further include a gasket that insulates the rivet terminal from the case. The rechargeable battery may further include a fixing member insulating member between the fixing member and the case. The rechargeable battery may further include an insulating cover covering the terminal plate.

The first electrode may be a negative electrode and the second electrode may be a positive electrode.

The rechargeable battery may further include a cap plate sealing the case, the short circuit tab and the external member being at an exterior of the cap plate. The external member may extend adjacent and parallel to a surface of the exterior of the case.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
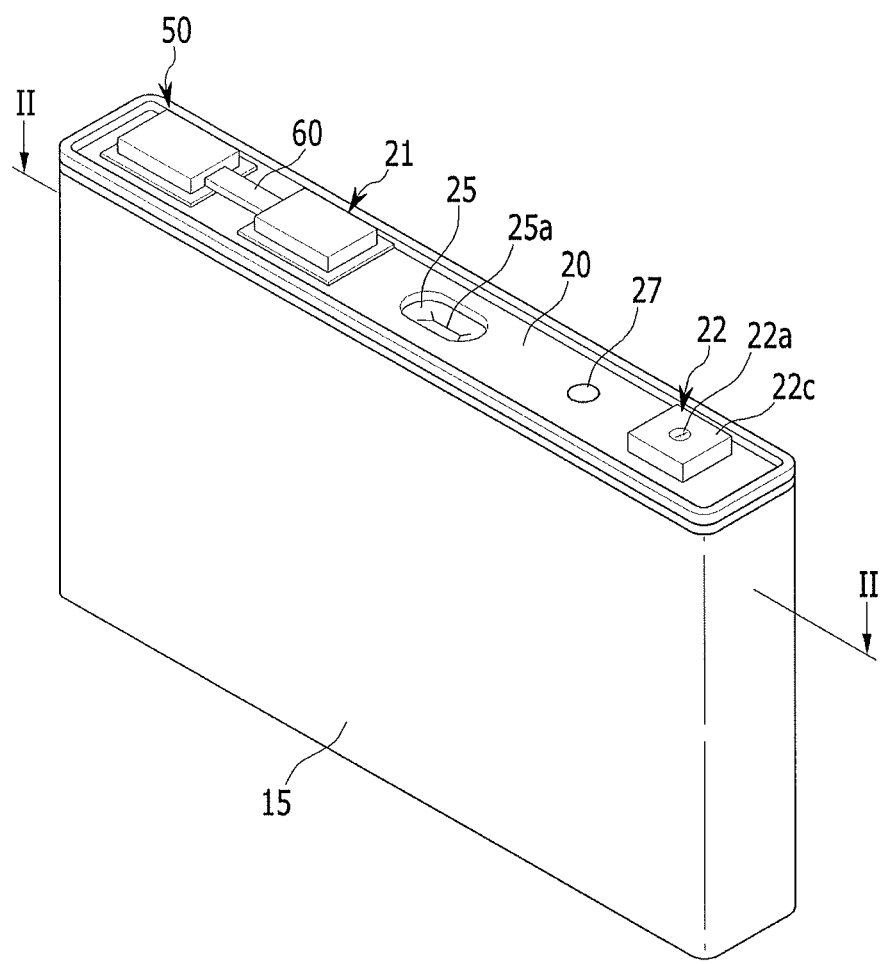
FIG. 1 illustrates a perspective view of a rechargeable battery in accordance with an exemplary embodiment.

Example embodiments will now be described more fully hereinafter with reference to the accompanying drawings; however, they may be embodied in different forms and should not be construed as limited to the embodiments set forth herein.

In the drawing figures, the dimensions may be exaggerated for clarity of illustration. Like reference numerals refer to like elements throughout.

Figure 2:
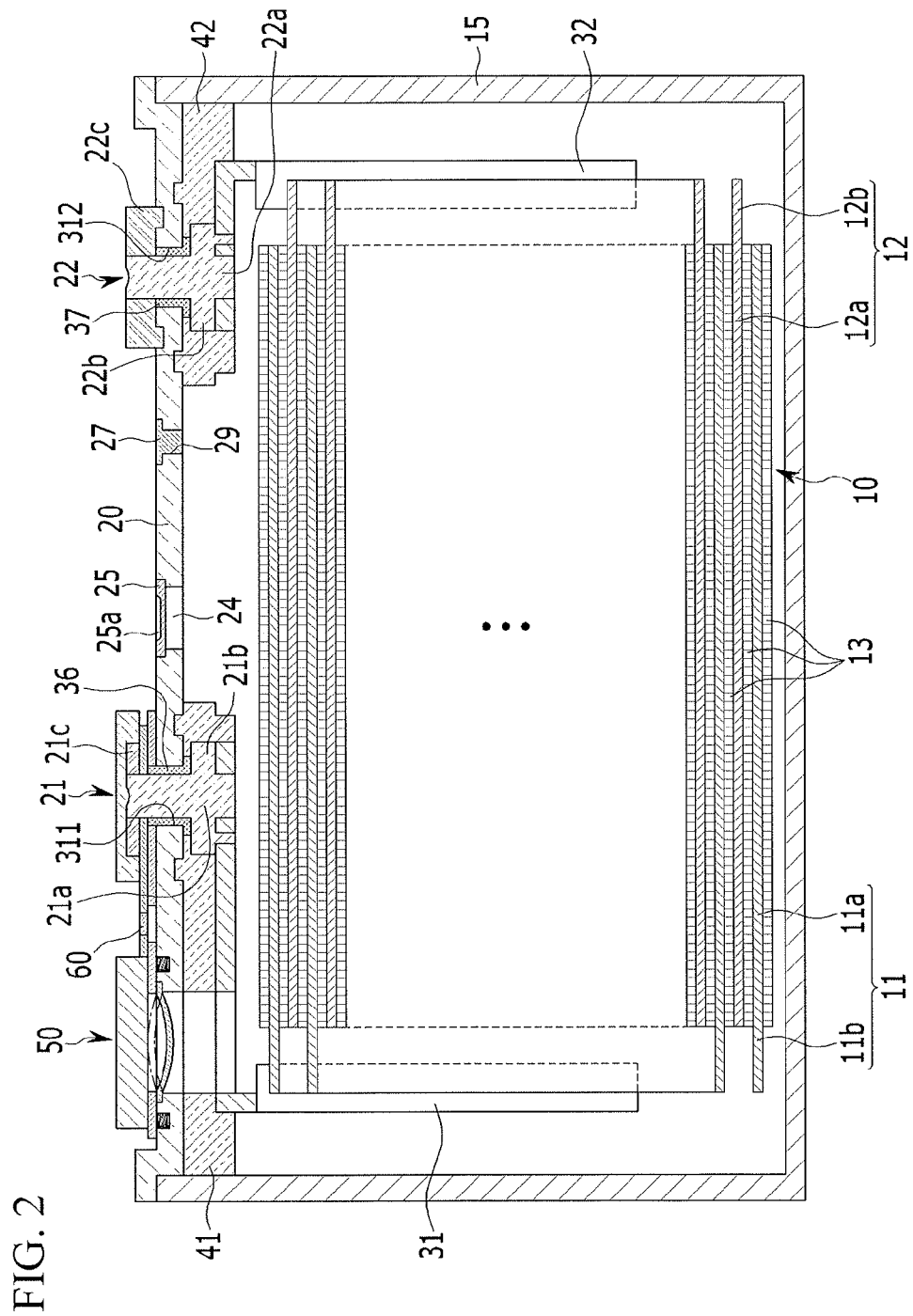
FIG. 2 illustrates a cross-sectional view of FIG. 1 taken along the line II-II.

FIG. 1 is a perspective view of a rechargeable battery in accordance with an exemplary embodiment, and FIG. 2 is a cross-sectional view of FIG. 1 taken along the line II-II. Referring to FIG. 1 and FIG. 2, a rechargeable battery in accordance with an exemplary embodiment may include an electrode assembly 10 charging and discharging current, a case 15 for housing the electrode assembly 10, a cap plate 20 coupled to an opening of the case 15, and first and second electrode terminals 22 and 50, and an electrode connection portion 21 disposed at the cap plate 20, a, and a fuse unit 60 connecting the second electrode terminal 50 and the electrode connection portion 21. Hereinafter, the second electrode terminal 50 may be referred to as a negative terminal, and the first electrode terminal 22 may be referred to as a positive terminal.

The electrode assembly 10 may include a separator 13, a first electrode 11 disposed at one side of the separator 13, and a second electrode 12 disposed at the other side of the separator 13. The separator 13, the first electrode 11, and the second electrode 12 may be spirally-wound, as in a jelly-roll configuration. The separator 13 may be an insulator. Hereinafter, the first electrode 11 may be referred to as a negative electrode, and the second electrode 12 may be referred to as a positive electrode. For purposes of nomenclature, it is to be understood that the first electrode 11 is electrically connected to the second electrode terminal 50 (negative in the exemplary embodiment) and the second electrode 12 is electrically connected to the first electrode terminal 22 (positive in the exemplary embodiment).

In other implementations, the electrode assembly may include a separator, a negative electrode formed as a single layer and disposed on the separator, and a positive electrode formed as a single layer and stacked on the negative electrode with the separator interleaved. In other implementations, the electrode assembly may be assembled by folding and stacking the negative electrode, the separator, and the positive electrode in a zigzag manner (not shown).

The negative electrode 11 and the positive electrode 12 may include coated regions 11a and 12a and uncoated regions 11b and 12b, respectively. The coated regions 11a and 12a may be metal plate current collectors coated with an active material. The uncoated regions 11b and 12b may be exposed current collectors since the active material is not coated thereon.

The uncoated region 11b of the negative electrode 11 may be formed at one end of the negative electrode 11 along the spiral-wound negative electrode 11. The uncoated region 12b of the positive electrode 12 may be formed at one end of the positive electrode 12 along the spiral-wound positive electrode 12. The uncoated regions 11b and 12b may be disposed at respective ends of the electrode assembly.

The case 15 may be formed in a cuboid shape in order to internally house the electrode assembly 10 and the electrolyte solution. The case 15 may include an opening formed at one side of the cuboid for connecting an external space and an internal space. The opening allows the electrode assembly 10 to be inserted inside the case 15.

The cap plate 20 may be made of a thin plate and may be disposed at the opening of the case 15. The cap plate 20 may close and seal the opening of the case 15. The cap plate 20 may further include an electrolyte injection opening 29 and a vent hole 24.

The electrolyte injection opening 29 may allow an electrolyte solution to be injected inside the case after the cap plate 20 is coupled to the case 15. After injecting the electrolyte solution, the electrolyte injection opening 29 may be closed and sealed by the sealing cap 27.

The vent hole 24 may be closed and sealed with the vent plate 25 in order to discharge internal pressure of the rechargeable battery. When the internal pressure of the rechargeable battery reaches a predetermined pressure, the vent plate 25 may be cracked and the vent hole 24 may be opened. The vent plate 25 may have a notch 25a where such cracking takes place.

The electrode connection portion 21 and the positive terminal 22 may penetrate the case 15 or the cap plate 20 and may be electrically connected to the electrode assembly 10. That is, the electrode connection portion 21 may be electrically connected to the negative electrode 11 of the electrode assembly 10, and the positive terminal 22 may be electrically connected to the positive electrode 12 of the electrode assembly 10. The electrode connection portion 21 is connected to the negative terminal 50. Therefore, the electrode assembly 10 may be connected to the outside of the case 15 through the negative terminal 50 and the positive terminal 22.

The electrode connection portion 21 and the positive terminal 22 may include rivet terminals 21a and 22a disposed at the terminal holes 311 and 312 of the cap plate 20, respectively, flanges 21b and 22b widely formed at an inner side of the cap plate 20 and integrally formed with the rivet terminals 21a and 22a, and plate terminals 21c and 22c disposed at an outer side of the cap plate 20 and riveted or welded at the rivet terminals 21a and 22a.

The negative and positive gaskets 36 and 37 may be disposed between the rivet terminals 21a and 22a of the electrode connection portion 21 and positive terminal 22 and the terminal holes 311 and 312 of the cap plate 20. The negative and positive gaskets 36 and 37 insulate and seal between the rivet terminals 21a and 22a of the electrode connection portion 21 and positive terminal 22 and the cap plate 20.

The negative and positive gaskets 36 and 37 may further extend between the flanges 21b and 22b and the cap plate 20. The negative and positive gaskets may further insulate and seal between the flanges 21b and 22b and the cap plate 20. That is, when the electrode connection portion 21 and positive terminal 22 are disposed at the cap plate 20, the negative and positive gaskets 36 and 37 may prevent electrolyte solution from leaking through the terminal holes 311 and 312.

Negative and positive electrode lead tabs 31 and 32 may electrically connect the electrode connection portion 21 and the positive terminal 22 to the negative and positive electrodes 11 and 12 of the electrode assembly 10, respectively. That is, the negative and positive electrode lead tabs 31 and 32 may be coupled to lower ends of the rivet terminals 21a and 22a, thereby caulking the lower ends. Accordingly, the negative and positive electrode lead tabs 31 and 32 may be connected to the rivet terminals 21a and 22a while being supported by the flanges 21b and 22b.

Negative and positive insulating members 41 and 42 may be disposed between the negative and positive electrode lead tab 31 and 32 and the cap plate 20, respectively. Accordingly, the negative and positive insulating members 41 and 42 may electrically insulate the negative and positive electrode lead tabs 31 and 32 from the cap plate 20. Also, upper portions of the negative and positive insulating members 41 and 42 may be connected to the cap plate 20, and lower portions of the negative and positive insulating members 41 and 42 may surround the negative and positive electrode lead tabs 31 and 32 and the rivet terminals 21a and 22a and the flange 21b and 22b. Accordingly, the negative and positive insulating members 41 and 42 may stabilize a respective connection structure.

Figure 3:
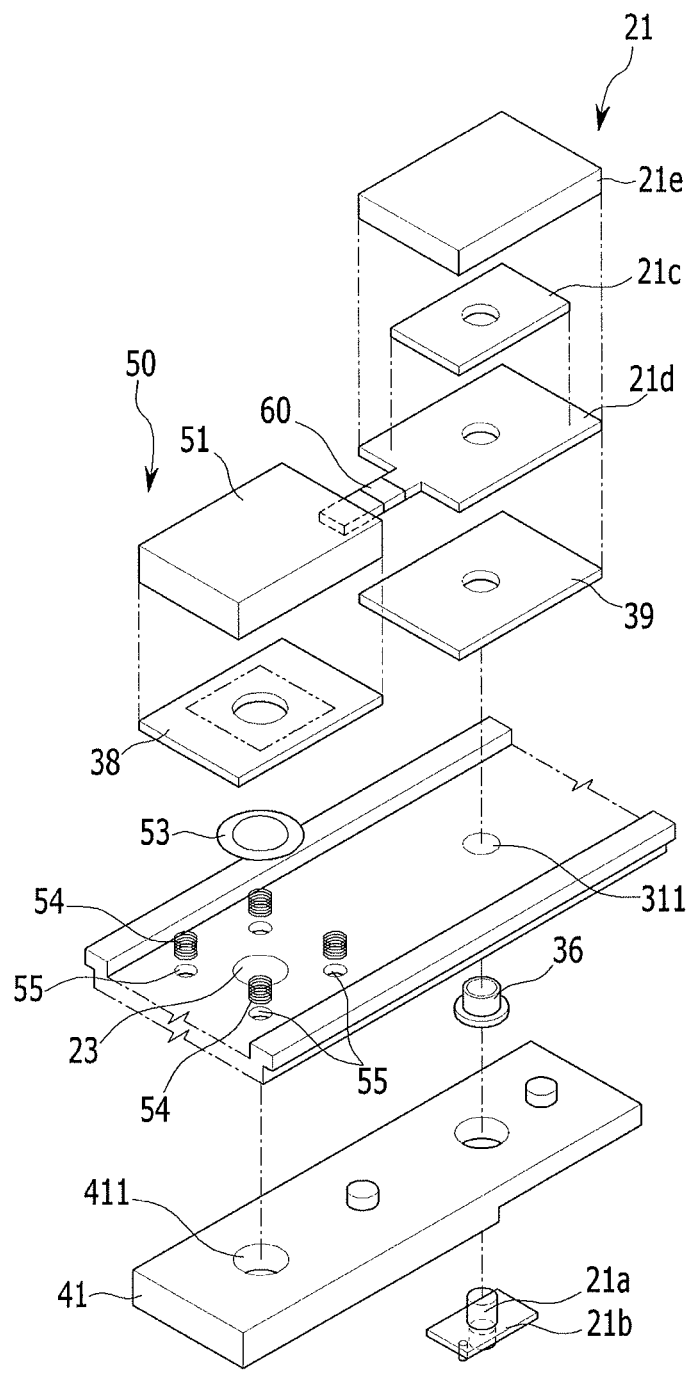
FIG. 3 illustrates an exploded perspective view of an electrode connection portion, a negative terminal, and a fuse unit of FIG. 1.
Figure 4:
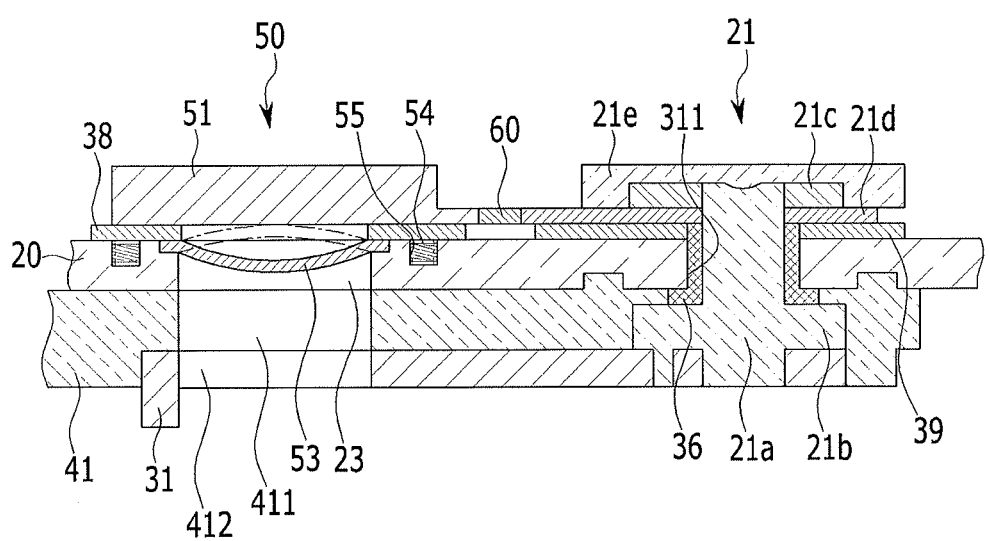
FIG. 4 illustrates a cross-sectional view of an electrode connection portion, a negative terminal, and a fuse unit of FIG. 1.

FIG. 3 is an exploded perspective view of the electrode connection portion 21, the negative terminal 50, and the fuse unit 60 of FIG. 1, and FIG. 4 is a cross-sectional view of the electrode connection portion 21, the negative terminal 50, and the fuse unit 60 of FIG. 1. Referring to FIG. 3 and FIG. 4, the negative terminal 50 and the fuse unit 60 will be described with reference to the electrode connection portion 21.

The negative terminal 50 may include a short-circuit tab 51 and a short-circuit member 53 disposed to face the short-circuit tab 51. The short-circuit tab 51 and the short-circuit member 53 may be separated or short-circuited according to an internal pressure of the rechargeable battery. The negative terminal 50 may further include an insulating member 38 disposed between the short-circuit tab 51 and the short-circuit member 53.

The short-circuit tab 51 may be electrically insulated from the cap plate 20 due to disposition of the insulating member 38 on an outer surface of the cap plate 20. The short-circuit tab 51 may be electrically connected to the electrode connection portion 21. The short-circuit member 53 may be installed at a short-circuit hole 23 of the cap plate 20, thereby facing the short-circuit tab 51. The short-circuit member 53 may be electrically connected to the positive terminal 22 through the cap plate 20.

The insulating member 38 may electrically insulate the short-circuit tab 51 from the short-circuit member 53 when the rechargeable battery operates in a normal state. The insulating member 38 may disconnect the short-circuit tab 51 from the short-circuit member 53.

The short-circuit tab 51 may be connected to the electrode connection portion 21 and may extend toward the short-circuit member 53. Therefore, the short-circuit tab 51 and the short-circuit member 53 may face each other at a location corresponding to the short-circuit hole 23, thereby forming a separated state (solid line state) or a short-circuited state (two-point chain line state)(see FIG. 4).

The negative electrode insulating member 41 and the negative electrode lead tab 31 may include through-holes 411 and 412, respectively. The through-holes 411 and 412 may be formed corresponding to the short-circuit hole 23 in order for internal pressure to be applied to the short-circuit member 53 through the short-circuit hole 23.

The electrode connection portion 21 may further include a fixing member 21d corresponding to the short-circuit tab 51 of the negative terminal 50. The fixing member 21d may be connected to the rivet terminal 21a and disposed at an outer side of the cap plate 20 with the insulating member 39 interleaved. The insulating member 39 may electrically insulate the fixing member 21d and the cap plate 20. The cap plate 20 may be electrically insulated from the electrode connection portion 21.

For example, the fixing member 21d and the terminal plate 21c may be connected to an upper portion of the rivet terminal 21a, thereby caulking the upper portion of the rivet terminal 21a. Accordingly, the fixing member 21d and the terminal plate 21c may be coupled to the upper portion of the rivet terminal 21a. Therefore, the fixing member 21d and the terminal plate 21c may be fixed at the cap plate 20 with the insulating member 39 interleaved. The terminal plate 21c may be covered by an insulating cover 21e made of an electric insulating material.

Furthermore, in other implementations, only one of the fixing member 21d and the terminal plate 21c may be present, and a corresponding insulating cover 21e and a fuse unit 60 may be disposed. For example, when only the fixing member is present, the rivet terminal 21a may be connected to the fixing member, the fuse unit 60 may be connected to the fixing member 21d, and the insulating cover may cover the fixing member. When only the terminal plate 21c is present, the rivet terminal 21a may be connected to the terminal plate 21c, the fuse unit 60 may be connected to the terminal plate 21c, and the insulating cover 21e may cover the terminal plate 21c.

Referring to FIG. 3 and FIG. 4 again, the fuse unit 60 may be electrically connected to the short-circuit tab 51 with the fixing member 21d interleaved. Accordingly, the short-circuit tab 51 of the negative terminal 50 may be connected to the electrode connection portion 21 through the fuse unit 60 and the fixing member 21d.

Finally, the positive electrode 12 of the electrode assembly 10 may be connected to the short-circuit member 53 through the positive terminal 22 and the cap plate 20. The negative electrode 11 may be connected to the short-circuit tab 51 through the electrode connection portion 21 and the fuse unit 60. The negative and positive electrodes 11 and 12 of the electrode assembly 10 may maintain a state that can be shorted by the short-circuit tab 51 and the short-circuit member 53, which are disposed at the outside of the cap plate 20.

Since the fuse unit 60 is disposed outside the case 15 and the cap plate 20 as described above, an arc that may be created when the short-circuit member 53 and the short-circuit tab 51 are short-circuited operates is unlikely to adversely affect the electrolyte solution or the electrode assembly 10. For example, when the short-circuit member 53 and the short-circuit tab 51 are short-circuited, the fuse unit 60 is melted down and disconnected. The arc may be generated when the fuse unit 60 is melted and disconnected.

The fuse unit 60 is disposed outside the case 15 and the cap plate 20. Accordingly, the remaining current of the electrode assembly 10 can be discharged through the terminal plate 21c of the electrode connection portion 21 by opening the insulating cover 21e after the fuse unit 60 is shorted due to the external short-circuit. Therefore, it is possible to discharge and replace a rechargeable battery within a battery module, thereby improving safety.

Furthermore, the negative terminal 50 may further include an elastic member 54 disposed between the insulating member 38 and the cap plate 20. The elastic member 54 may be disposed at an outer edge of the short-circuit hole 23 and may elastically support the insulating member 38 and the short-circuit tab 51.

The elastic member 54 may be formed as a compressed coil spring and may be inserted at four recesses 55 of the cap plate 30. The elastic member 54 may be formed as one compressed coil spring that surrounds an outer edge of the short-circuit hole (not shown).

The elastic member 54 may be connected to the fixing member 21d through the fuse unit 60 and may be maintained in a compressed state by the short-circuit tab 51. When the compressed state is released as a result of the fuse unit 60 being melted down, the insulating member 38 and the short-circuit tab 51 may raised by the released elastic force, thereby separating the short-circuit tab 51 from the short-circuit member 53. Accordingly, the elastic force of the elastic member 54 may be set to be lower than a compression force applied to the short-circuit tab 51 by the fuse unit 60 and the fixing member 21d.

Figure 5:
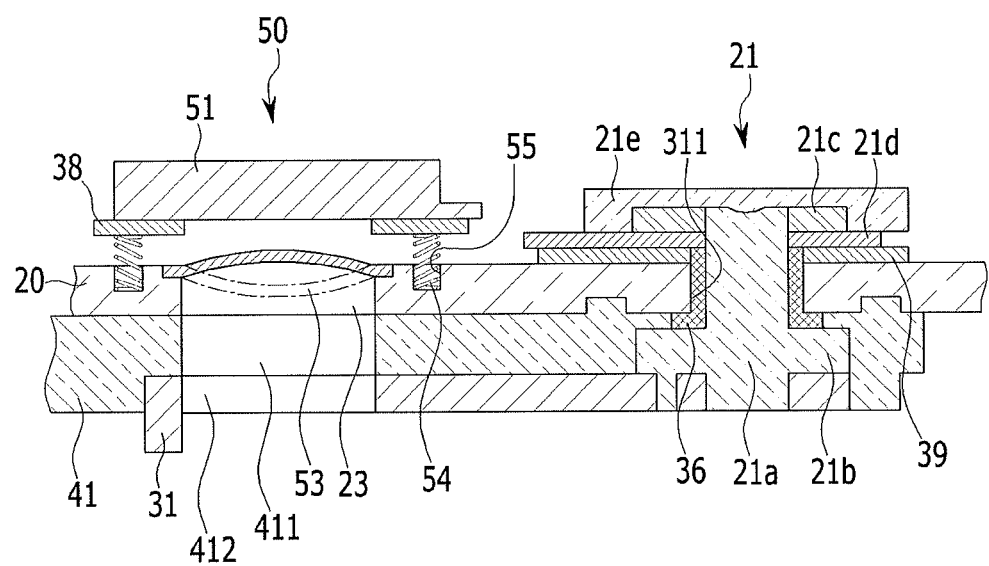
FIG. 5 illustrates a cross-section view that illustrates an operation state of a fuse unit of FIG. 4.

FIG. 5 is a cross-sectional view illustrating an operating state of the fuse unit 60 of FIG. 4. Referring to FIG. 5, a high voltage current is discharged through the short-circuit tab 51 and the short-circuit member 53 according to the operation of the negative terminal 50. Accordingly, the fuse unit 60 is melted down and disconnected.

When the fuse unit 60 is shorted, the elastic member 54 becomes free from the binding force of the fixing member 21*d*. Accordingly, the insulating member 38 and the short-circuit tab 51 may be raised by the elastic force. When the short-circuit tab 51 is separated from the short-circuit member 53, current in the rechargeable battery between the negative and positive terminals 50 and 22 is completely cut off.

By way of summation and review, a rechargeable battery may include an electric assembly, a case for housing the electric assembly, a cap plate for closing and sealing an opening of the case, and an electrode terminal disposed at the cap plate so as to be electrically connected to the electrode assembly. The electrode assembly may include a separator, a positive electrode disposed at one side of the separator, and a negative electrode disposed the other side of the separator.

A rechargeable battery may be repeatedly charged and discharged. Accordingly, excessive heat may be generated inside the rechargeable battery or an electrolyte solution may decompose. Such excess heat generation or electrolyte solution decomposition may increase the internal pressure of the rechargeable battery. The increment of the internal pressure may cause ignition or explosion of the rechargeable battery.

In order to prevent the ignition or explosion caused by the increment of the internal pressure, the rechargeable battery may include a short circuit unit at the outside of the case. The short circuit unit may create a short circuit between the negative electrode and the positive electrode of the electrode assembly when the internal pressure of the rechargeable battery increases. When the short circuit unit is short-circuited, a large amount of current is discharged. As a result, a charge stage of the electrode assembly becomes reduced.

Due to the discharge of large amount of current, a fuse unit may become melted and shorted. In a rechargeable battery according to a comparative example, the fuse unit is disposed at a discharge path that connects the electrode assembly and the electrode terminal. The rechargeable battery internally includes the fuse unit. Accordingly, it is difficult to discharge remaining current after the fuse unit is shorted. Furthermore, the shorted fuse unit may cause arc, and the arc may cause ignition or explosion of the electrolyte solution. Therefore, the stability of the rechargeable battery according to a comparative example may be deteriorated when the negative terminal is shorted or when the fuse unit operates.

The described technology has been made in an effort to provide a rechargeable battery having advantages of maintaining a stable state when a negative terminal is shorted or when a fuse unit operates. According to an exemplary embodiment, the fuse unit is disposed at the outside of the battery case, such as on the outside of the cap plate. Accordingly, the remaining current of the electrode assembly may be discharged after the external short-circuit is shorted or after the rechargeable battery is overcharged. The remaining current may be discharged through an electrode connection portion and a respective rechargeable battery may be replaced in battery module after the fuse unit between the negative terminal and the electrode connection portion is melted and shorted. Moreover, the electrolyte solution may be protected from an arc that is generated at a shorted-part after the fuse unit is shorted. According to an exemplary embodiment, the negative terminal may be separated from the cap plate after the fuse unit is shorted. Accordingly, an entire over-current may be prevented in a module having a plurality of rechargeable batteries.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
    a case having an interior and an exterior;
    an electrode assembly having a first electrode and a second electrode, the electrode assembly being disposed in the interior of the case,
    an electrode terminal, the electrode terminal including a short circuit tab at the exterior of the case;
    an electrode connection portion, the electrode connection portion being electrically connected to the electrode terminal through a fuse portion, the fuse portion being positioned between and extending between the electrode connection portion and the electrode terminal, wherein:
    the first electrode is electrically connected to the electrode connection portion, and
    the first electrode, the electrode connection portion, and the short circuit tab are electrically insulated from the second electrode.

2. The rechargeable battery as claimed in claim 1, wherein:
    the second electrode is electrically connected to the case, and
    the electrode terminal further includes a short circuit plate electrically connected to the second electrode through the case, the short circuit plate being spaced apart from the short circuit tab and being deformable into contact with the short circuit tab to electrically connect the first electrode and the second electrode to trigger a short circuit condition.

3. The rechargeable battery as claimed in claim 2, wherein the electrode connection portion has an external member including the fuse portion; the fuse portion is meltable in response to a short circuit current generated upon triggering of the short circuit condition to disconnect the short circuit tab and the external member.

4. The rechargeable battery as claimed in claim 3, further including an elastic member between the short circuit tab and the case.

5. The rechargeable battery as claimed in claim 4, further including a short circuit tab insulating member between the short circuit tab and the case, the elastic member being between the short circuit tab insulating member and the case.

6. The rechargeable battery as claimed in claim 5, wherein the external member is configured to exert a compressive force on the short circuit tab to maintain the elastic member in a compressed state.

7. The rechargeable battery as claimed in claim 6, wherein the electrode terminal is configured such that a releasing of the force of the external member on the short circuit tab upon melting of the fuse portion releases the elastic member from the compressed state to exert an elastic force on the short circuit tab to separate the short circuit tab from the short circuit plate.

8. The rechargeable battery as claimed in claim 7, wherein:
    the electrode terminal is located at a short circuit hole in the case, and the elastic member includes at least one spring member adjacent to an outside edge of the short circuit hole.

9. The rechargeable battery as claimed in claim 8, wherein the at least one spring member is a coil spring.

10. The rechargeable battery as claimed in claim 8, wherein the case includes at least one recess that accommodates the elastic member.

11. The rechargeable battery as claimed in claim 10, wherein the at least one recess entirely accommodates the elastic member in the compressed state such that the short circuit tab insulation member contacts the case.

12. The rechargeable battery as claimed in claim 3, wherein:
   the electrode connection portion includes a rivet terminal extending from the interior of the case to the exterior of the case through a hole in the case, and
   the external member includes a terminal plate coupled to a distal end of the rivet terminal outside the case and a fixing member coupled to the rivet terminal between the terminal plate and the case.

13. The rechargeable battery as claimed in claim 12, further including a gasket that insulates the rivet terminal from the case.

14. The rechargeable battery as claimed in claim 12, further including a fixing member insulating member between the fixing member and the case.

15. The rechargeable battery as claimed in claim 12, furthering including an insulating cover covering the terminal plate.

16. The rechargeable battery as claimed in claim 3, further including a cap plate sealing the case, the short circuit tab and the external member being at an exterior of the cap plate.

17. The rechargeable battery as claimed in claim 3, wherein the external member extends adjacent and parallel to a surface of the exterior of the case.

18. The rechargeable battery as claimed in claim 1, wherein the first electrode is a negative electrode and the second electrode is a positive electrode.

* * * * *